United States Patent [19]
Lindewall

[11] 4,134,610
[45] Jan. 16, 1979

[54] PROCESS FOR THE PREPARATION OF SEMI-RIGID POLYURETHANE FOAM HAVING EXCEPTIONAL SHOCK-ABSORBING PROPERTIES AND VEHICLE BUMPERS THEREOF

[75] Inventor: Frank W. Lindewall, Stenungsund, Sweden

[73] Assignee: Berol Kemi AB, Stenungsund, Sweden

[21] Appl. No.: 754,469

[22] Filed: Dec. 27, 1976

[30] Foreign Application Priority Data

Dec. 29, 1975 [SE] Sweden .............................. 7514661
Feb. 13, 1976 [SE] Sweden .............................. 7602076

[51] Int. Cl.$^2$ ...................... B60R 19/08; C08G 18/14; B29D 27/04
[52] U.S. Cl. ................................... 293/71 R; 114/219; 264/46.7; 428/315; 428/425; 521/128; 521/167; 521/174; 521/176
[58] Field of Search .................... 260/2.5 AB, 2.5 AC, 260/2.5 AM, 2.5 AZ, 2.5 AQ; 428/315; 293/70, 71 R; 114/219

[56] References Cited
U.S. PATENT DOCUMENTS

| | | | |
|---|---|---|---|
| 3,108,975 | 10/1963 | Lambert et al. | 260/2.5 AC |
| 3,348,597 | 10/1967 | Goldberg et al. | 260/2.5 AZ X |
| 3,493,257 | 2/1970 | Fitzgerald et al. | 293/71 |
| 3,728,288 | 4/1973 | Cobbs, Jr. et al. | 260/2.5 AZ X |
| 3,734,557 | 5/1973 | McKenzie | 293/71 R |
| 3,801,518 | 4/1974 | Irwin et al. | 260/2.5 AB X |
| 3,836,424 | 9/1974 | Reymore, Jr. et al. | 260/2.5 AZ X |
| 3,836,487 | 9/1974 | Carter | 260/2.5 AK |
| 3,852,150 | 12/1974 | Weller | 293/70 X |
| 3,865,417 | 2/1975 | Zwiekl | 293/70 X |
| 3,939,106 | 2/1976 | Dunleavy et al. | 260/2.5 AM |

*Primary Examiner*—H.S. Cockeram

[57] ABSTRACT

A process is provided for producing semi-rigid polyurethane foams having exceptional shock-absorbing properties, even after repeated compression, prepared by the reaction of a polyisocyanate; a polyether polyol having a molecular weight within the range from about 2,000 to about 10,000; from about 1 to about 5% by weight of water per part by weight of polyether polyol; from about 1 to about 6% by weight of urea and/or thiourea per part by weight of polyether polyol; and a cross-linking compound having at least three active hydrogen atoms per molecule that are reactive with isocyanate groups and having a molecular weight below about 1000 in an amount from about 5 to about 25% by weight per part by weight of polyether polyol; the amount of polyisocyanate being selected to give an isocyanate index within the range from about 0.7 to about 1.4.

The process provides polyurethane foams that have a cellular structure that remains undamaged under compression as high as 60% at temperatures within the range from about +60° C to about −40° C, and the consequent deformation is less than 1% even after ten compressions of at lest 50% in rapid succession.

Accordingly, the invention further provides vehicle bumpers having an impact-receiving layer of this polyurethane foam, and that meet the requirements of FMVSS 215.

23 Claims, 14 Drawing Figures

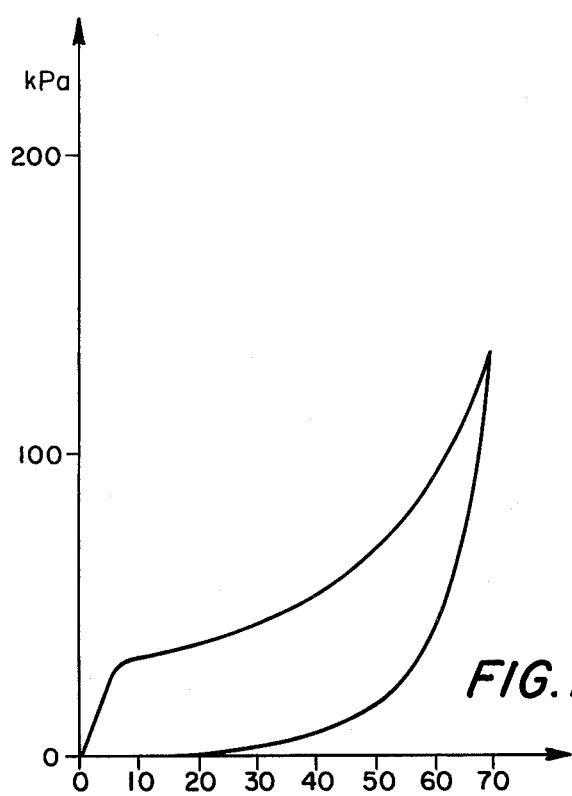
FIG.IA
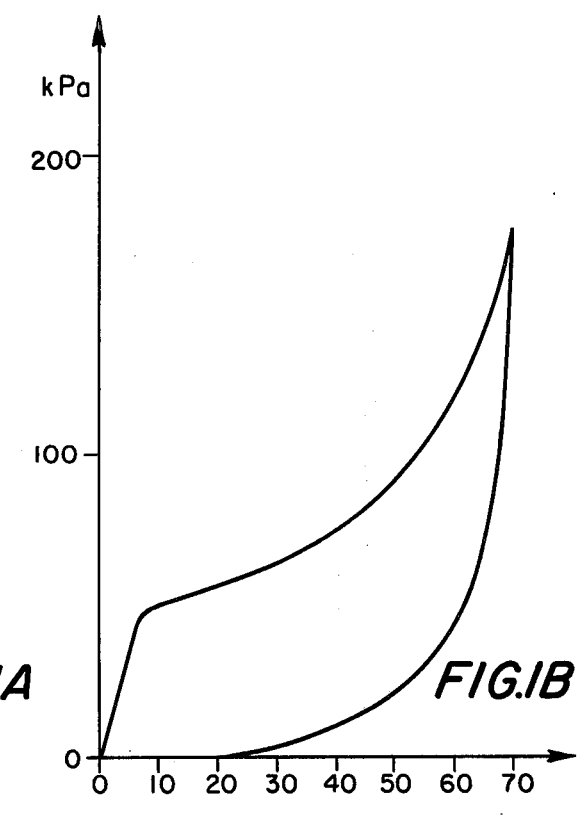
FIG.IB
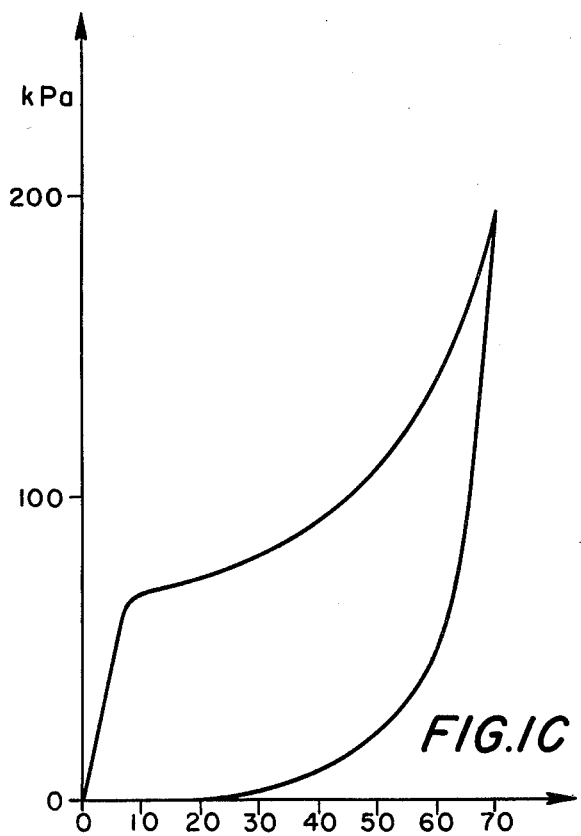
FIG.IC
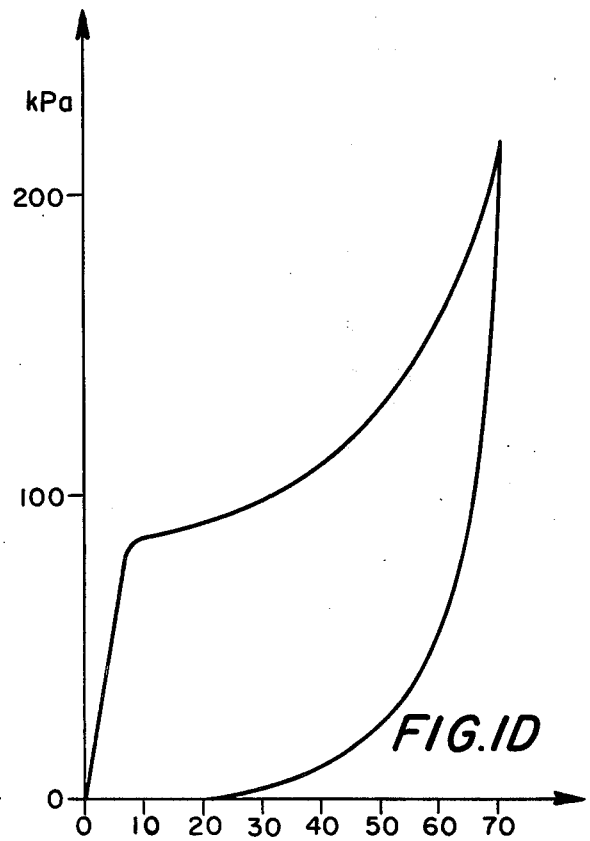
FIG.ID

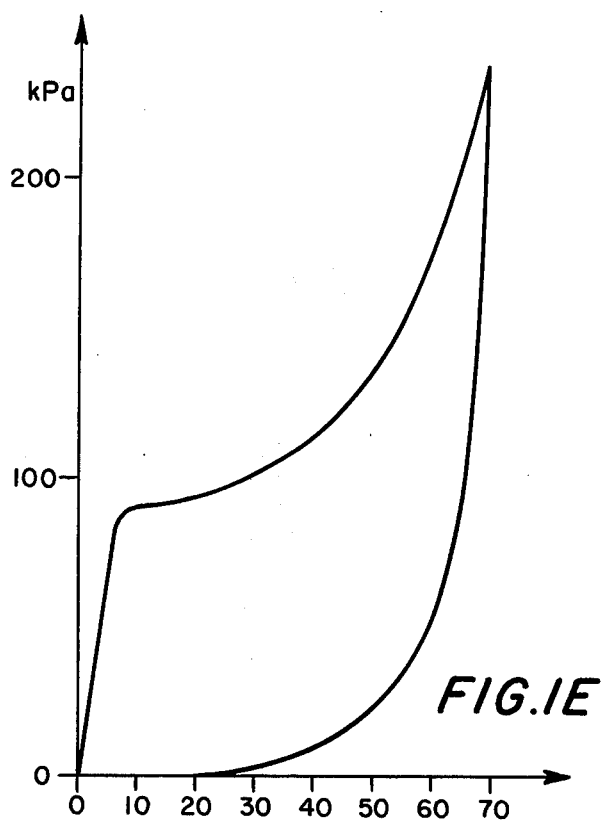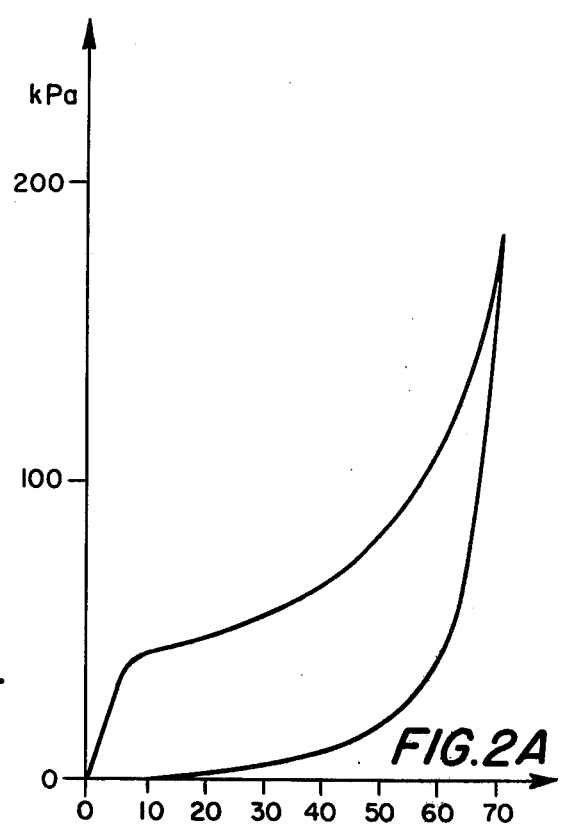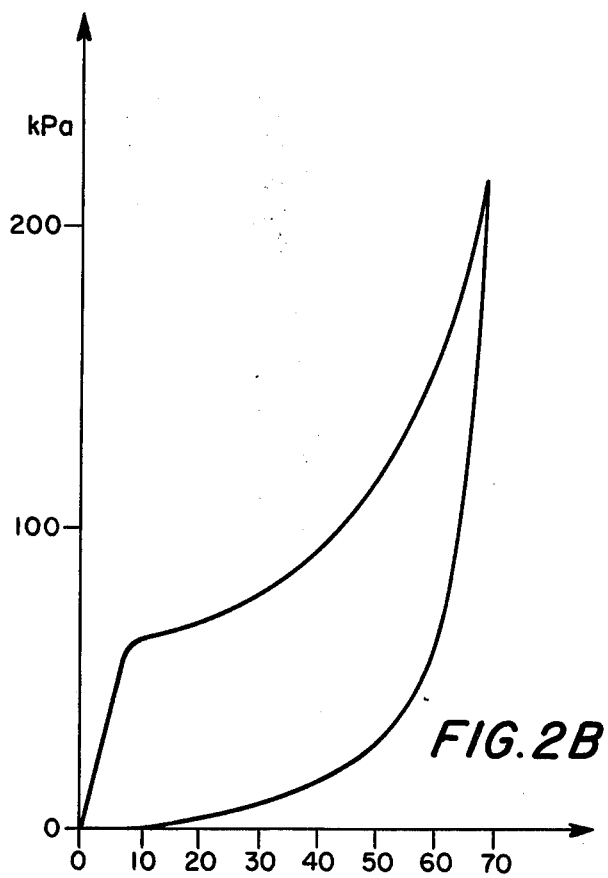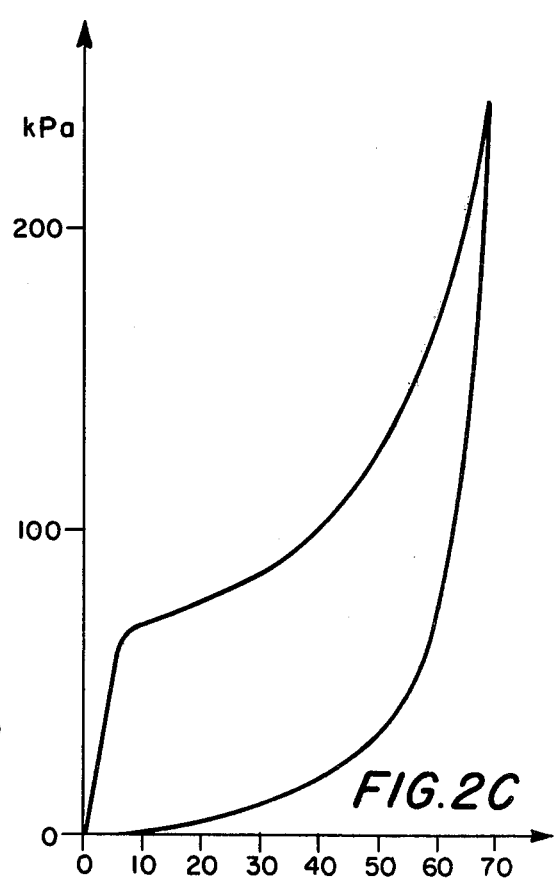

PROCESS FOR THE PREPARATION OF SEMI-RIGID POLYURETHANE FOAM HAVING EXCEPTIONAL SHOCK-ABSORBING PROPERTIES AND VEHICLE BUMPERS THEREOF

The Federal Motor Vehicle Safety Standard FMVSS 215 establishes requirements for safety bumpers for motor vehicles, and is applicable to all motor vehicles manufactured on or after Sept. 1, 1973. The objective of the standard is to prevent low speed collisions from impairing the safe operation of the vehicle. Certain requirements for impact resistance and the configuration of the front and rear surfaces of the bumper system are prescribed, and the bumper must meet specified requirements during and after impact by a pendulum-type test device, followed by impact into a fixed collision barrier that is perpendicular to the line of movement of the vehicle, while the vehicle is travelling forward at a speed of five miles per hour. The bumper impact-receiving face must not have a permanent deformation greater than three-eights of an inch from its original configuration 30 minutes following each impact against the barrier.

One way to meet the requirement is to incorporate a hydraulic system behind a rigid bumper structure. However, hydraulic systems are heavy, and require a considerable amount of space for proper operation. Consequently, they are not favored by motor vehicle manufacturers.

An alternative way of meeting the requirement, interposition of a shock-absorbent resin foam layer as the impact-receiving surface, has been the subject of considerable investigation. This approach contemplates a rigid bumper bar faced with a shock-absorbent layer of semi-rigid polyurethane resin. The polyurethane resin foam layer receives and absorbs the impact.

Prior to the promulgation of FMVSS 215, semi-rigid polyurethane foams had been in use for some time as shock-absorbing foams for instrument panels, steering wheels, different types of bumpers, and shock-absorbent devices, as well as packing materials. These materials do not in general have the capability of resisting permanent deformation after repeated compressions in excess of 50%. Such resistance to permanent deformation of deformation set has not been a feature of polyurethane foam materials, but for most purposes, where the material is not subjected to repeated compression, this has posed no problem.

The situation changed when FMVSS 215 was promulgated. Very few of the available semi-rigid polyurethane foams are capable of meeting the FMVSS 215 requirements.

The FMVSS 215 requirements are discussed in U.S. Pat. No. 3,939,106, issued Feb. 17, 1976 to Dunleavy and Hawker. In their discussion of the art prior to their invention, Dunleavy and Hawker point out that the polyurethane polymers provided by U.S. Pat. No. 3,493,257, patented Feb. 3, 1970 to Fitzgerald, Haines, Harris and Kienle, are not capable of meeting the FMVSS 215 requirements. The polymers of this patent are too sensitive to temperature changes, and at cold temperatures the polyurethane foam is too hard.

U.S. Pat. No. 3,939,106 provides an improved polyurethane foam using high molecular weight polyol starting materials. The polyurethane foam of that invention is prepared by forming and curing a reaction mixture of:

"a. a polymer polyol comprising a major liquid polyoxyalkylene polyol that has a molecular weight of at least 1500 and a hydroxyl number from 20 to 120 and that contains therein a minor amount of film-forming organic polymer having a molecular weight of at least 5,000, "b. an aromatic polyamine having at least two primary amine groups ($-NH_2$) attached to carbon atoms of the same or different aromatic rings, at least one of such carbon atoms being adjacent to a carbon atom having a substituent other than hydrogen, "c. an aromatic glycol, "d. an organic polyisocyanate in an amount that provides from 0.8 to 1.3 (preferably from 0.95 to 1.1) isocyanate groups per active hydrogen group in the reaction mixture, "e. a catalytic amount of catalyst for the curing of the reaction mixture to produce the elastomer, and "f. a blowing agent in an amount sufficient to produce a cellular structure in the elastomer, "said reaction mixture containing from 97 to 65 (preferably from 97 to 85) parts by weight of (a) and from 3 to 35 (preferably from 3 to 15) parts by weight of (b) per 100 parts by weight of (a) and (b) and said reaction mixture containing from 1 to 35 (preferably from 1 to 20) parts by weight of (c) per 100 parts by weight of (a) and (c), with the proviso that the reaction mixture contains no more than 35 parts by weight of (b) and (c) per 100 parts by weight of (a), (b) and (c)."

Even in the case of the polymers of that patent, however, the patentees point out that:

". . . a specific formulation (reaction mixture) for an energy absorbing impact elastomer cannot be described which would answer each and every application requirement. The reaction mixture used in a particular case will depend upon the specifications necessary for satisfactory performance under the given conditions. For example, the particular operating temperature range, the final forces and deflections allowed during the impact cycle, cost requirements, processing requirements, etc., must be considered for each case."

In accordance with the invention, a series of semi-rigid polyurethane foams are provided having a high shock-absorbent capability over a wide range of temperatures, even after repeated compressions in excess of 50%, and which do not acquire a permanent deformation or deformation set in excess of 1% even after rapidly repeated compressions. The term "semi-rigid" means that the polyurethane foam must be subjected to a pressure within the range from about 50 to about 200 kPa to obtain a compression of 40%. Consequently, the polyurethane foam in accordance with the invention can be used as the impact absorbent layer on bumpers which will meet the requirements of FMVSS 215.

The process for preparing semi-rigid polyurethane foams of these properties in accordance with the invention comprises reacting a polyisocyanate; a polyether polyol having a molecular weight within the range from about 2,000 to about 10,000, preferably from about 3,000 to about 7,000; from about 1 to about 5%, preferably from about 1.5 to about 4%, by weight of water per part by weight of polyether polyol; from about 1 to about 6%, preferably from about 1.5 to about 45%, by weight of urea and/or thiourea per part by weight of polyether polyol; a cross-linking compound having at least three active hydrogen atoms per molecule that are reactive with isocyanate groups and having a molecular weight below about 1,000, preferably below about 500, in an amount from about 5 to about 25%, preferably from about 7 to about 20% by weight per part by weight of polyether polyol; the amount of polyisocyanate being selected to give an isocyanate index within the range from about 0.7 to about 1.4, preferably from about 0.9 to about 1.2.

The polyurethane foams obtained by this process have a cellular structure that remains undamaged by high compression at temperatures within the range from about +60° C to about −40° C, even after compressions as high as 60%, and the consequent deformation is less than 1%, even after ten compressions of at least 50%, in rapid succession. Accordingly, this polyurethane foam is exceptionally suited for the manufacture of polyurethane bumpers that meet the requirements of FMVSS 215.

The invention therefore further provides a vehicle bumper comprising a bumper frame or support, and an impact-absorbing facing layer comprising a polyurethanne foam of the invention having a density within the range from about 50 to about 150 g/dm$^3$, preferably from about 70 to about 120 g/dm$^3$, and a deformation (noted thirty minutes after compression) not exceeding 1% over a temperature range from about +60° C to about −40° C.

In the drawings:

FIGS. 1a, 1b, 1c, 1d and 1e represent the force in kPa required for compression and retrogression of the test foams of Example 1.

FIGS. 2a, 2b, 2c, 2d and 2e represent the force in kPa required for compression and retrogression of the test foams of Example 2.

Figure 2D:
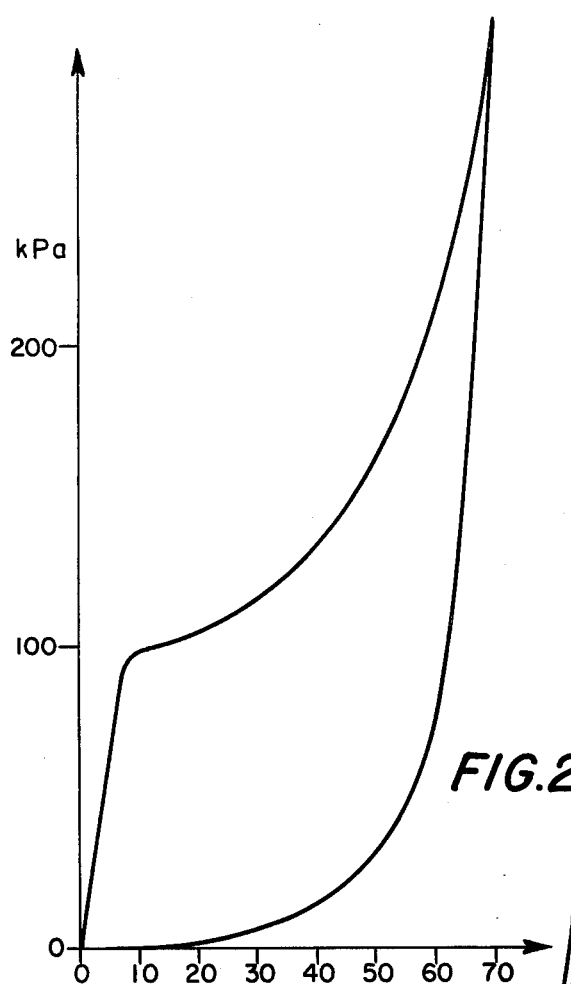
Figure 2E:
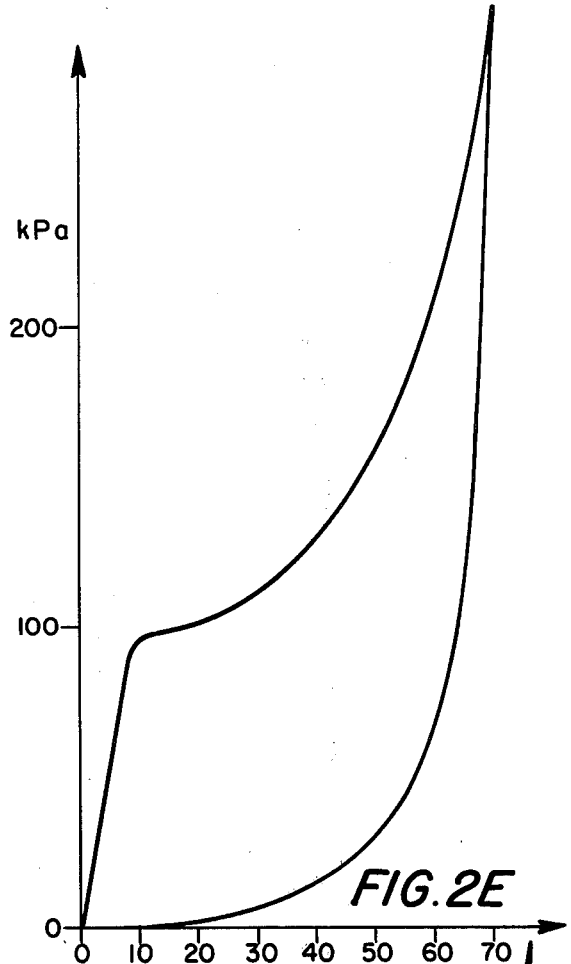
Figure 3:
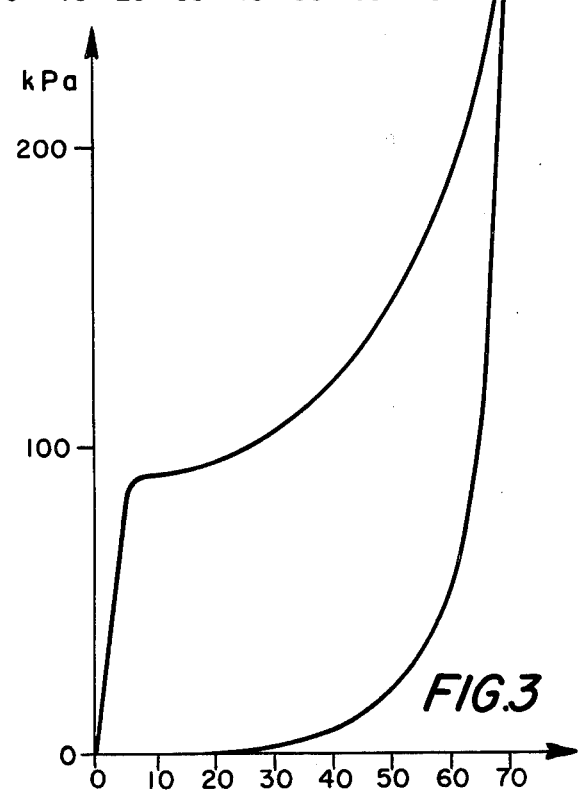
FIG. 3 represents the force in kPa required for compression and retrogression of the test foams of Example
Figure 4:
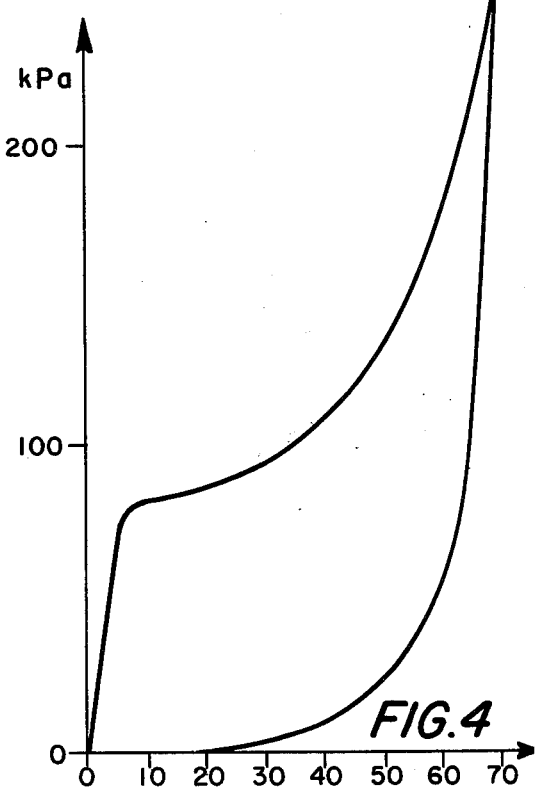
FIG. 4 represents the force in kPa required for compression and retrogression of the test foams of Example 4.
Figure 5:
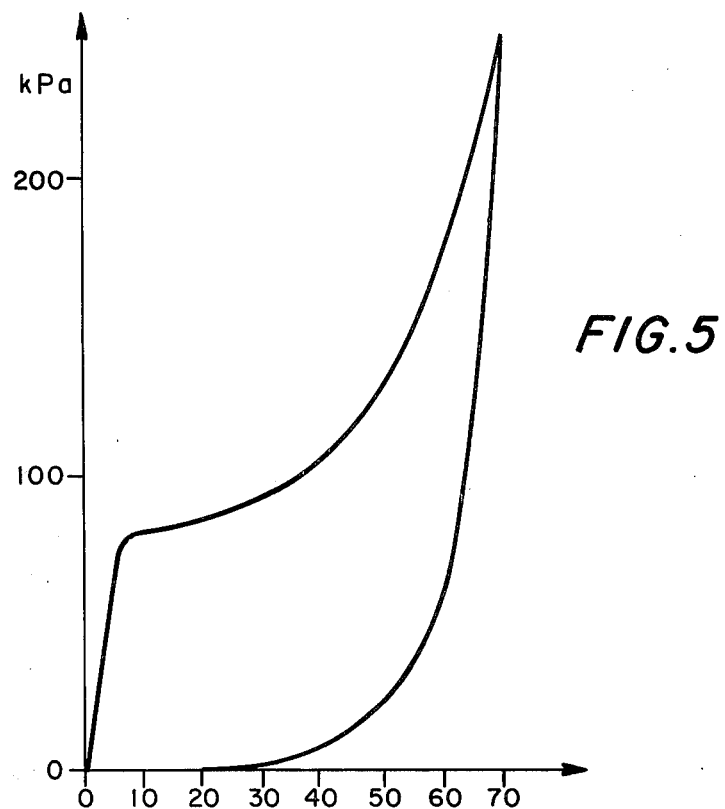
FIG. 5 represents the force in kPa required for compression and retrogression of the test foams of Example 5.

The shock-absorbent capability of the polyurethane foam of the invention is attributed to the presence of urea and/or thiourea, and the cross-linking compound. In the absence of either or both of these ingredients, the shock-absorbing capability is greatly reduced.

The cross-linking compound can contain the active hydrogens reactive with isocyanate groups attached to nitrogen, for example, as a part of amino groups, or attached to oxygen, for example, as hydroxyl groups, or a mixture of amino and hydroxyl groups.

Exemplary amines include ethylene diamine, diethylene triamine, triethylene tetramine, tetraethylene pentamine, propylene diamine, dipropylene triamine, butylene diamine, dibutylene triamine.

Exemplary hydroxyamines include monoethanolamine, diethanolamine, triethanolamine, monopropanolamine, dipropanolamine, dibutanolamine, monobutanolamine, diisopropanolamine, tripropanolamine, and tributanolamine.

Exemplary polyols include ethylene glycol, glycerol, pentaerythritol, trimethylol propane, trimethylol ethane, butanetriol, hexanetriol, arabitol, xylitol, sorbitol, mannitol, dulcitol, triethylolmethane, triethylolethane, and erythritol.

Also useful are the polyoxyalkylene polyols obtained by condensation of an alkylene oxide (such as ethylene oxide, propylene oxide, butylene oxide, and mixtures thereof) with any of the polyols just referred to above. Illustrative alkylene oxide adducts of polyhydroxylkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,6- and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like; preferably the adducts of ethylene oxide, propylene oxide, epoxybutane, or mixtures thereof. A preferred class of alkylene oxide adducts of polyhydroxyalkanes are the ethylene oxide, propylene oxide, butylene oxide, or mixtures thereof, adducts of trihydroxyalkanes. Ethylene oxide capped (—OC$_2$H$_4$OH terminated) propylene oxide polyols are preferred because of their increased reactivity over noncapped propylene oxide polyols thus leading to decreased demold times for the molded article. Illustrative hydroxyl-terminated polyesters are those which are prepared by polymerizing a lactone in the presence of an active hydrogen-containing starter as disclosed in U.S. Pat. No. 2,914,556.

It is important that the amount of cross-linking compound be at least 5% per part by weight of polyether polyol. An amount below 5% gives a foam whose shock absorbency is too low. On the other hand, an amount in excess of about 25% of cross-linking compound results in a foam that is too rigid, and insufficiently compressible to meet the FMVSS standard.

It is generally preferred that the cross-linking compound contains a mixture of hydroxyl and amino groups, and that at least 50% of the crosslinking compound be an amine having at least one hydroxyl group, such as triethanolamine, diethanolamine, and monoethanolamine. The amino alcohols have a catalytic effect on the reaction between hydroxyl groups and isocyanate groups, and therefore can replace the conventional catalysts employed in the preparation of polyurethane foams, either in whole or in part.

Resistance of the polyurethane foam to development of compression set can be enhanced if the reaction mixture contains a small amount of a strong base, usually within the range from about 0.001 to about 1% by weight of the polyether polyol. Strong bases which can be used include the inorganic bases, the alkali metal and alkaline earth metal hydroxides, alkaline-reacting inorganic salts of these metals, including the alkali metal and alkaline earth metal carbonates, borates, phosphates, acetates, formates and isocyanates, as well as strong organic amine bases. Exemplary are sodium hydroxide, potassium hydroxide, calcium hydroxide, barium hydroxide, barium oxide, calcium oxide, strontium hydroxide, sodium carbonate, potassium carbonate, sodium acetate, potassium formate, sodium borate, potassium borate, sodium phosphate, potassium phosphate, sodium benzoate, potassium benzoate, calcium phosphate, pyridine, tributylamine, morpholine, triethylamine, ethylisopropylamine, and tripropylamine. Strong bases have the capacity of rupturing cell walls in the course of foam formation without collapsing the foam, thus resulting in a foam having a high proportion of open cells. This is important in increasing the compressibility of the foam, since an open cell foam does not develop high internal cellular gas pressure upon compression.

The polyether polyol is an adduct of an alkylene oxide to a polyol having at least two and preferably at least three hydroxyl groups with reactive hydrogen atoms. The alkylene oxide can be ethylene oxide, propylene oxide, butylene oxide, and any mixture of two or three thereof. The polyol can have from two to six hydroxyl groups and from two to six carbon atoms, and includes ethylene glycol, diethylene glycol, triethylene glycol, butanediol, pentanediol, propanediol, dipropylene glycol, hexanediol, glycerol, trimethylol propane, triethylolmethane, triethylolpropane, butanetriol, hexanetriol, pentaerythritol, erythritol, sorbitol, mannitol, xylitol, arabitol, dulcitol, trimethylolethane, and triethylolethane.

Also useful compounds having reactive hydrogen atoms which form adducts with alkylene oxides include amines and aminoalcohols, including, for example, aliphatic, aromatic and heterocyclic polyamines and aminoalcohols having at least one amine and one hydroxyl group or two amine groups, such as monoethanolamine, diethanolamine, triethanolamine, ethylenediamine, hexamethylenediamine, diethylenetriamine, triethylenetetramine, tetraethylenepentamine, pentaethylenehexamine, dipropylenetriamine, and tripropylenetetramine.

As the alkylene oxide, ethylene oxide and propylene oxide are preferred. Mixtures of from 5 to 60% ethylene oxide and from 95 to 40% propylene oxide (calculated on the total weight of alkylene oxide units derived from alkylene oxide) are preferred. If desired, a small amount of butylene oxide, up to about 20% by weight, can also be added. Amounts of ethylene oxide in excess of 60% give relatively hydrophilic foams, which are capable of absorbing large amounts of water, which may be a disadvantage.

If several alkylene oxides are used, they can be added separately, in series, in increments, alternatingly, or together as a mixture, or any combination of these alternatives.

In general, the polyether polyols should have from about 2.2 to about 3.5 reactive hydrogens per mole. A hydroxyl number within the range from about 25 to about 40, and a primary hydroxyl number within the range from about 10 to about 80%, and preferably from about 60 to about 80%, are preferred.

The organic polyisocyanate should have at least two and preferably three or more isocyanate groups. The aromatic isocyanates are preferred but aliphatic, heterocyclic, cycloaliphatic, and mixed aliphatic aromatic, aliphatic heterocyclic, and aliphatic cycloaliphatic polyisocyanates can also be used.

Exemplary are tetramethylene diisocyanate, hexamethylene diisocyanate, toluene diisocyanate, xylene diisocyanate, phenylene diisocyanate, naphthylene diisocyanate, 1-methyl-2,6-phenylene diisocyanate, cyclohexane diisocyanate, diphenylmethane diisocyanate, and polyphenylpolymethylene polyisocyanate.

Of these polyisocyanates, toluene diisocyanate is preferred, either in its isomeric 2,4-form or 2,6-form, or as mixtures of these two isomeric forms. A suitable mixture is composed of about 80% 2,4 - toluene diisocyanate and 20% 2,6 -toluene diisocyanate.

Another class of suitable polyisocyanates has at least two benzene rings, with one isocyanate group per ring, the benzene rings being interconnected by ether, sulfone, sulfoxide, methylene, ethylene, propylene, or carbonyl groups, and having the general structure:

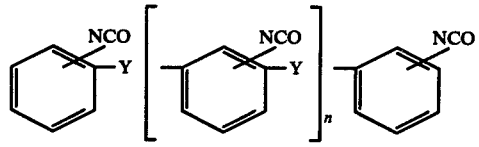

where
Y is a linking group selected from the group consisting of

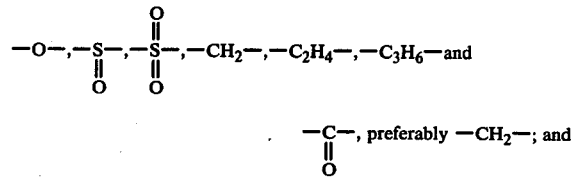

$n$ is a number within the range from about 0.2 to about 1.5, it being understood that n represents an average of the species present, and therefore need not be an integer, in which species n is an integer and can range from 0 to about 10.

The amount of polyisocyanate employed is stoichiometrically equivalent to the reactive hydrogens present that are reactive with isocyanate groups, taking into account the polyether polyol, carbamine compound, water and other reactants, so that the resulting polyurethane foam has an isocyanate index, i.e., a ratio between isocyanate groups and isocyanate-reactive hydrogen atoms present in the mixture, within the range from about 0.7 to about 1.4, and preferably from about 0.9 to about 1.2.

The reaction between the polyisocyanate and the polyether polyol is carried out in the presence of a catalyst, the catalyst being any catalyst known to catalyze this polymerization reaction. The catalyst forms no part of the instant invention.

An amine catalyst can be used, particularly tertiary amines, such as diethylene triamine, dimethylaminoethanol, and tetramethyl ethylenediamine.

Also useful are organometallic compounds such as lead octoate, dibutyltin dilaurate, tin octoate, tin-2-ethylhexoate, lead naphthenate and cobalt naphthenate.

Only a small amount of the catalyst is required. The amount can be within the range from about 0.01 to about 5.0% by weight of the polyether polyol, and preferably from about 0.05 to about 1.0% by weight.

The blowing agent is a compound capable of generating an inert gas under the reaction conditions used, by reaction to produce a gas, or by volatilization. According to the invention the blowing agent is water. If so desired the water could be combined with other blowing agents like volatile halocarbons (especially chlorocarbons and chlorofluorocarbons) such as methylene chloride, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1,1 fluoromethane, 1,1-difluoro-1,2,2-trichloroethane, chloropentafluoroethane, 1-chloro-1-fluoroethane, 1-chloro-2-fluoroethane, 1,1,2-trifluoroethane, 2, -chloro-1,1,2,3,3,4,4-heptafluorobutane, hexafluorocyclobutane and octafluorobutane; and low-boiling hydrocarbons such as butane, pentane, hexane, and cyclohexane.

The amount of blowing agent is determined by the desired foam properties. From about 1 to about 5 parts by weight of water and, if so desired, 0.3 to 0.1 part by weight of another blowing agent per part by weight of the polyether polyol is generally satisfactory.

Foam stabilizers such as silicone oils can be added, to improve foam stability in the course of foam formation, and the physical strength of the polymer.

The density of the foam is controlled by the addition of water and the blowing agent.

The temperature of the reaction is in no way critical. The reaction proceeds at temperatures slightly above normal room temperature, such as 30° C. The maximum temperature is that which leads to undesirably rapid decomposition of the blowing agent, and loss of control of the foam properties. in general, the reaction temperature is within the range from about 30° to about 130° C.

A prepolymer can first be prepared by reacting the polyether polyol with a stoichiometric excess of the multifunctional polyisocyanate, or, alternatively, of the polyisocyanate with a stoichiometric excess of the polyether polyol, under circumstances such that the prepolymer contains isocyanate and/or hydroxyl terminal groups.

The amounts of polyether polyol and polyisocyanate are so chosen that the isocyanate index is within the range from about 1.5 to about 3, when the prepolymer contains isocyanate terminal groups, and within the range from about 0.1 to about 0.7, when the prepolymer contains hydroxyl terminal groups.

The reactive prepolymer is then mixed with the remaining polyol or polyisocyanate, cross-linking compound, carbamide compound, catalyst, foam stabilizer, filler, pigment, and any other reactant component, and introduced into a mold.

It is also possible to mix all of the reactants together, and allow the reaction to proceed with this reaction mixture. This can be done by firxt mixing polyether, polyol, cross-linking agent and catalyst, and then adding polyisocyanate. It is also possible first to react polyisocyanate and the carbamide compound, and then add the remaining ingredients.

The following Examples in the opinion of the inventor represent preferred embodiments of the invention.

EXAMPLE 1

Five polyurethane foams were prepared, in accordance with the following procedure. The polyether polyol used was prepared by addition to glycerol of, first, propylene oxide, to a molecular weight of about 4,300, and then ethylene oxide, to a molecular weight of about 5,000. The formulations of each of these polyurethane foams were as follows:

TABLE I

| Example No. | 1A | 1B | 1C | 1D | 1E |
|---|---|---|---|---|---|
| Ingredients | Parts by Weight | | | | |
| Polyether polyol | 100 | 100 | 100 | 100 | 100 |
| Triethanolamine | 15 | 15 | 15 | 15 | 15 |
| Water | 3.0 | 3.0 | 3.0 | 3.0 | 3.0 |
| Dimethylaminoethanol | 0.25 | 0.25 | 0.25 | 0.25 | 0.25 |
| Polyphenylpolymethylene polyisocyanate (functionality 2.5) | 95.9 | 95.9 | 95.9 | 95.9 | 95.9 |
| Urea | 0 | 1 | 2 | 3 | 4 |
| Isocyanate Index | 1 | 0.95 | 0.91 | 0.87 | 0.84 |

The reaction mixture was prepared by mixing together:

(1) polyether polyol and triethanolamine;
(2) water, dimethylaminoethanol, and urea; and
(3) polyphenylpolymethylene polyisocyanate.

Each of the reaction mixtures was poured into a mold 1800 mm × 150 mm × 120 mm and allowed to react for 0.5 hour. After conditioning for 24 hours at room temperature and 50% relative humidity, 50 mm × 50 mm samples of each test foam 1A to 1E were taken. The samples were compressed at a rate of 150 mm per minute to a compression of 70%. Compression was then released, at the same rate. The force in kPa required for compression and retrogression was registered by a recorder, resulting in the diagrams 1A, 1B, 1C, 1D and 1E of the drawing.

It is apparent from the diagrams that the polyurethane foams in accordance with the invention, Examples 1B, 1C, 1D and 1E, have a very high shock-absorbing capability. The polyurethane foam 1A without the urea was quite unsatisfactory in this respect.

Samples of foams 1A to 1E were also subjected to a dynamic impact test. Each of the test foam specimens was subjected to a 60% compression at 25° C, the compression and retrogression being completed within this time interval. The foams were then allowed to stand for 30 minutes. In each case, the deformation remaining after this time was less than 1%.

It is apparent that the polyurethane foams in accordance with the invention have a high shock-absorbent capability, together with an absence of defomation set.

EXAMPLE 2

Five polyurethane foams were prepared in accordance with the following procedure. The polyether polyol used was prepared by addition to glycerol of, first, propylene oxide to a molecular weight of about 4,300, and then, ethylene oxide to a molecular weight of 5,000. The formulations of each of these polyurethane foams were as follows:

TABLE II

| Example No. | 2A | 2B | 2C | 2D | 2E |
|---|---|---|---|---|---|
| Ingredients | Parts by Weight | | | | |
| Polyether polyol | 95.9 | 100 | 103.6 | 107.3 | 110.9 |
| Triethanolamine | 15 | 15 | 15 | 15 | 15 |
| Water | 3.0 | 3.0 | 3.0 | 3.0 | 3.0 |
| Dimethylaminoethanol | 0.25 | 0.25 | 0.25 | 0.25 | 0.25 |
| Polyphenylpolymethylene polyisocyanate (functionality 2.5) | 95.9 | 95.9 | 95.9 | 95.9 | 95.9 |
| Thiourea | 0 | 1 | 2 | 3 | 4 |
| Isocyanate Index | 1 | 1 | 1 | 1 | 1 |

The reaction mixture was prepared by mixing together:

(1) polyether polyol and triethanolamine;
(2) water, dimethylaminoethanol, and thiourea; and
(3) polyphenylpolymethylene polyisocyanate.

Each of these mixtures was poured into a mold 1800 mm × 150 mm × 120 mm and allowed to react for 0.5 hour. After conditioning for 24 hours at room temperature and 50% relative humidity, 50 mm × 50 mm samples of each test foam were taken. The samples were then compressed at a rate of 150 mm per minute to a compression of 70%. Compression was then released at the same rate. The force required for compression and retrogression was registered by a recorder, resulting in the diagrams shown as 2A, 2B, 2C, 2D and 2E in the drawing.

It is apparent from the diagrams that the polyurethane foams in accordance with the invention, Examples 2B, 2C, 2D and 2E, have a very high shock-absorbing capability. The polyurethane foam without the thiourea (2A) was quite unsatisfactory in this respect.

Samples of the different polymers were also subjected to a dynamic impact test. Each of the test foam specimens were subjected to a 60% compression at 25° C, the compression then, retrogression being completed within this time interval. The foams were then formulation to stand for 30 minutes. In each case, the deformation remaining after this time was less than 1%.

It is apparent that the polyurethane foams in accordance with the invention have a high shock-absorbent capability, together with an absence of deformation set.

EXAMPLE 3

A polyurethane foam was prepared in accordance with the following procedure. The polyether polyol used was prepared by addition to glycerol of, first, propylene oxide to a molecular weight of about 4,300, and then ethylene oxide to a molecular weight of 5,000. The formation of the polyurethane foam was as follows:

TABLE III

| Ingredients | Parts by Weight |
| --- | --- |
| Polyether polyol | 100 |
| Triethanolamine | 15 |
| Water | 3.0 |
| Dimethylaminoethanol | 0.25 |
| Polyphenylpolymethylene polyisocyanate (functionality 2.5) | 106.5 |
| Urea | 2.0 |
| Isocyanate Index | 1 |

The reaction mixture was prepared by mixing together:

(1) polyether polyol and triethanolamine;
(2) water, dimethylaminoethanol, and urea; and
(3) polyphenylpolymethylene polyisocyanate.

The reaction mixture was poured into a mold 1800 mm × 150 mm × 120 mm and allowed to react for 0.5 hour. After conditioning for 24 hours at room temperature and 50% relative humidity, a 50 mm × 50 mm sample of the foam was taken. The sample was compressed at a rate of 150 mm per minute to a compression of 70%. Compression was then released at the same rate. The force required for compression and retrogression was registered by a recorder, resulting in the diagram 3 shown in the drawing.

It is apparent from the diagram that the polyurethane foam in accordance with the invention has a very high shock absorbent capability.

The sample was also subjected to a dynamic impact test. The test foam specimen was subjected to a 60% compression at 25° C, the compression and retrogression being completed within this time interval. The foam was then allowed to stand for 30 minutes. The deformation remaining after this time was less than 1%.

It is apparent that the polyurethane foam in accordance with the invention has a high shock-absorbent capability, together with an absence of deformation set.

EXAMPLE 4

A polyurethane foam was prepared in accordance with the following procedure. The polyether polyol used was prepared by addition to glycerol of, first, propylene oxide to a molecular weight of about 5000 and then, ethylene oxide to a molecular weight of 6000. The formulation of the polyurethane foam was as follows:

TABLE IV

| Ingredients | Parts by Weight |
| --- | --- |
| Polyether polyol | 100 |
| Triethanolamine | 15 |
| Water | 3.0 |
| Dimethylaminoethanol | 0.25 |
| Polyphenylpolymethylene polyisocyanate (functionality 2.5) | 105.2 |
| Urea | 2.0 |
| Isocyanate Index | 1 |

The reaction mixture was prepared by mixing together:

(1) polyether polyol and triethanolamine,
(2) water, dimethylaminoethanol, and urea; and
(3) polyphenylpolymethylene polyisocyanate.

The reaction mixture was poured into a mold 1800 mm × 150 mm × 120 mm and allowed to react for 0.5 hour. After conditioning for 24 hours at room temperature and 50% relative humidity, a 50 mm × 50 mm sample of the foam was taken. The sample was compressed at a rate of 150 mm per minute to a compression of 70 %. Compression was then released at the same rate. The force required for compression and retrogression was registered by a recorder, resulting in the diagram 4 shown in the drawing.

It is apparent from the diagram that the polyurethane foam in accordance with the invention has a very high shock-absorbent capability.

The sample was also subjected to a dynamic impact test. The test foam specimen was subjected to a 60% compression at 25° C, the compression and retrogression being completed within this time interval. The foam was then allowed to stand for 30 minutes. The deformation remaining after this time was less than 1%.

It is apparent that the polyurethane foam in accordance with the invention has a high shock-absorbent capability, together with an absence of deformation set.

EXAMPLE 5

A polyurethane foam was prepared in accordance with the following procedure. The polyether polyol used was prepared by addition to glycerol of, first, propylene oxide to a molecular weight of about 4,300, and then, ethylene oxide to a molecular weight of 5,000. The formulation of the polyurethane foam was as follows:

TABLE V

| Ingredients | Parts by Weight |
| --- | --- |
| Polyether polyol | 100 |
| Triethanolamine | 10 |
| Water | 4.0 |
| Diethanolamine | 2.0 |
| NaOH | 0.1 |
| Polyphenylpolymethylene polyisocyanate (functionality 2.5) | 115.0 |
| Glycerol | 2.0 |
| Urea | 3.0 |
| Isocyanate Index | 0.90 |

The reaction mixture was prepared by mixing together:

(1) polyether polyol and triethanolamine;
(2) water, diethanolamine, NaOH, glycerol, and urea; and (3) polyphenylpolymethylene polyisocyanate.

The reaction mixture was poured into a mold 1800 mm × 1500 mm × 120 mm and allowed to react for 0.5 hour. After conditioning for 24 hours at room temperature and 50% relative humidity, a 50 mm × 50 mm sample of the foam was taken. The sample was compressed at a rate of 150 mm per minute to a compression of 70%. Compression was then released at the same rate. The force required for compression and retrogression was registered by a recorder, resulting in the diagram 5 shown in the drawing.

It is apparent from the diagram that the polyurethane foam in accordance with the invention has very high shock absorbent capability.

The sample was also subjected to a dynamic impact test. The test foam specimen was subjected to a 60% compression at 25° C, the compression and retrogression being completed within this time interval. The foam was then allowed to stand for 30 minutes. The deformation remaining after this time was less than 1%.

Figure 6:
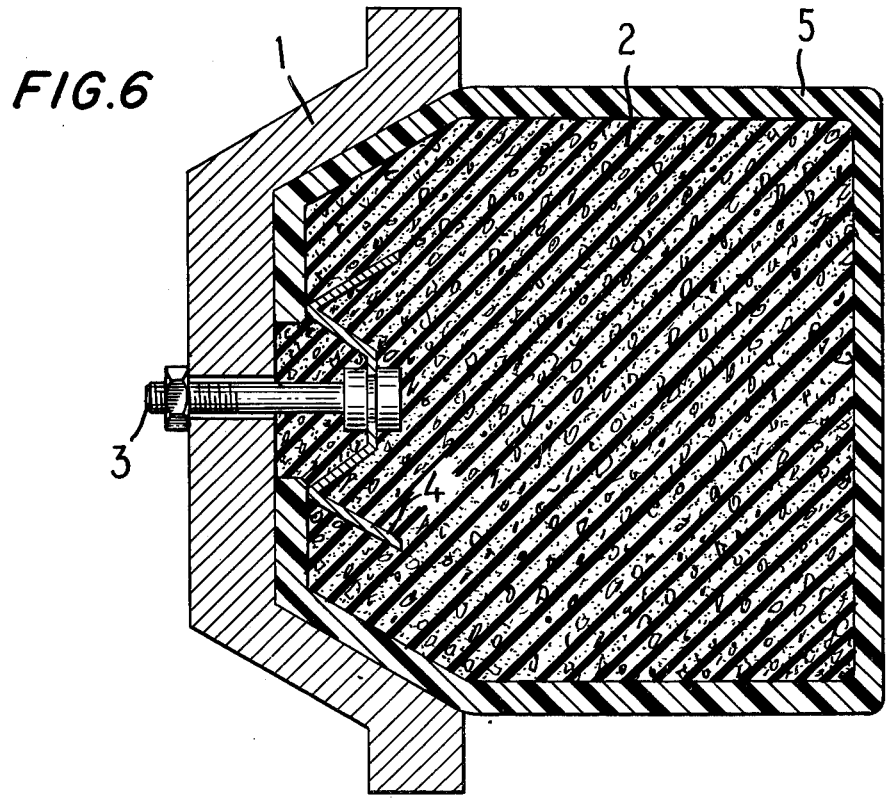
FIG. 6 represents a view in cross-section of a motor vehicle bumper including a polyurethane foam of Example 2.

The bumper shown in FIG. 6 has a frame 1 and an impact-receiving facing layer 2 of polyurethane foam mounted in the frame. The foam layer 2 has a density of 50–150 grs/dm and a remaining deformation of at most 1% at a dynamic compression of 60% within the temperature range from −40° C to +60° C after 30 minutes. The bumper according to the invention can easily be given such dimensions that it complies with the requirements of Federal Motor Vehicle Security Standard 215 (FMVSS 215). For a heavy vehicle, a polyurethane foam of a somewhat higher density is normally preferred to a light one.

The polyurethane foam layer 2 is attached to the frame 1 by a number of assembly screws 3 (of which only one screw is shown) which thread into a perforated aluminum sheet 4 molded in situ in the polyurethane foam layer. A protective cover 5 of a thin hydrophobic plastic film material such as polypropylene or polyethylene keeps out moisture and dirt from the polyurethane foam layer 2.

The polyurethane foam was made of the same formulation as Example 2C, injected into a mold 14 cms × 16 cms × 172 cms. The mold was closed, and the reaction mixture allowed to react at a mold temperature of 30° C. The polyurethane foam had a density of 96 grs/dm$^3$. Furthermore, before the casting of the polyurethane in the mold a perforated aluminum sheet with assembly screws 3 and a cover 5 had previously been inserted, arranged in such a way that after the casting and assembling of a frame, the structure shown in FIG. 6 was obtained. The bumper was tested according to FMVSS 215, and found to meet all requirements of the specification.

Having regard to the foregoing disclosure, the following is claimed as the inventive and patentable embodiments thereof:

1. A process for preparing semi-rigid polyurethane foam having a high shock-absorbent capability that remains substantially undamaged by high compression even after compressions as high as 60% over a wide range of temperatures, and which does not acquire a permanent deformation or deformatcion set in excess of 1% even after rapidly repeated compressions, which comprises reacting a polyisocyanate; a polyether polyol having a molecular weight within the range from about 2,000 to about 10,000; from about 1 to about 5% by weight of water per part by weight of polyether polyol; from about 1 to about 6% by weight of at least one member selected from the group consisting of urea and thiourea per part by weight of polyether polyol; and a cross-linking compound having at least three active hydrogen atoms per molecule that are reactive with isocyanate groups and having a molecular weight below about 1000 in an amount from about 5 to about 25% by weight per part by weight of polyether polyol; the amount of polyisocyanate being selected to give an isocyanate index within the range from about 0.7 to about 1.4 at a temperature at which reaction proceeds within the range from about 30° to about 130° C until a polyurethane foam is produced.

2. A process according to claim 1, which comprises first preparing a prepolymer by reacting the polyether polyol with a stoichiometric excess of the polyisocyanate to form a prepolymer containing isocyanate terminal groups.

3. A process according to claim 1, which comprises first preparing a prepolymer by reacting the polyisocyanate with a stoichiometric excess of the polyether polyol to form a prepolymer containing hydroxyl terminal groups.

4. A process according to claim 1 in which the member is urea.

5. A process according to claim 1 in which the member is thiourea.

6. A process according to claim 1 in which the cross-linking compound contains the active hydrogens reactive with isocyanate groups attached to nitrogen as a part of amino groups.

7. A process according to claim 1 in which the cross-linking compound contains the active hydrogens reactive with isocyanate groups attached to oxygen as a part of hydroxyl groups.

8. A process according to claim 1 in which the cross-linking compound contains the active hydrogens reactive with isocyanate groups attached to nitrogen and oxygen as a mixture of amino and hydroxyl groups.

9. A process according to claim 1 in which the cross-linking compound is a polyol.

10. A process according to claim 1 in which the cross-linking compound is a polyoxyalkylene polyol obtained by condensation of an alkylene oxide with polyol.

11. A process according to claim 1 in which the reaction mixture also contains an amount of a strong base within the range from about 0.001 to about 1% by weight of the polyether polyol.

12. A proces according to claim 11 in which the base is selected from the group consisting of the alkali metal and alkaline earth metal hydroxides, alkaline-reacting inorganic salts of these metals, and organic amine bases.

13. A process according to claim 1 in which the polyether polyol is an adduct of an alkylene oxide to a polyol having at least two hydroxyl groups with reactive hydrogen atoms, the alkylene oxide having from two to four carbon atoms and the polyol having from two to six hydroxyl groups and from two to six carbon atoms.

14. A process according to claim 1 in which the polyether polyol is an adduct of an alkylene oxide to an amine or aminoalcohol having at least one amine and one hydroxyl group or at least two amine groups.

15. A process according to claim 1 in which the organic polyisocyanate has at least two isocyanate groups and is selected from the group consisting of aliphatic, heterocyclic, cycloaliphatic, and mixed aliphatic aromatic, aliphatic heterocyclic, and aliphatic cycloaliphatic polyisocyanates.

16. A process according to claim 15, in which the polyisocyanate is toluene diisocyanate.

17. A process according to claim 15, in which the polyisocyanate has at least two benzene rings, with one isocyanate group per ring, the benzene rings being interconnected by a member selected from the group consisting of ether, sulfone, sulfoxide, methylene, ethylene, propylene, and carbonyl groups, and having the general structure:

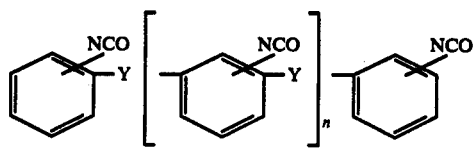

where
Y is a linking group selected from the group consisting of

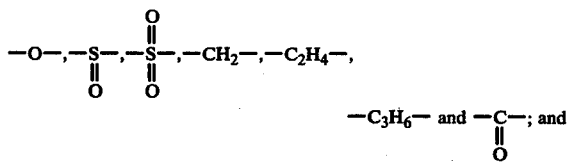

$n$ is a number within the range from about 0.2 to about 1.5 representing an average of the species present.

18. A process according to claim 1 in which the reaction between the polyisocyanate and the polyether polyol is carried out in the presence of a catalyst.

19. A process according to claim 18 in which the catalyst is an amine.

20. A process according to claim 18 in which the catalyst is an organometallic compound.

21. A process according to claim 1 in which the reaction mixture also includes a blowing agent capable of generating an inert gas under the reaction conditions used.

22. A polyurethane foam obtained by the process of claim 1, having a cellular structure that remains undamaged by high compression at temperatures within the range from about +60° C to about −40° C, even after compressions as high at 60%, and a consequent deformation of less than 1%, even after ten compressions of at least 50%, in rapid succession.

23. A vehicle bumper comprising a bumper support, and an impact-absorbing facing layer comprising a polyurethane foam of claim 22, having a density within the range from about 50 to about 150 g/dm$^3$ and a deformation noted 30 minutes after compression not exceeding 1% over a temperature range of from about +60° C to about −40° C.

* * * * *

UNITED STATES PATENT AND TRADEMARK OFFICE
CERTIFICATE OF CORRECTION

PATENT NO. : 4,134,610
DATED : January 16, 1979
INVENTOR(S) : Frank W. Lindewall It is certified that error appears in the above-identified patent and that said Letters Patent are hereby corrected as shown below:

| | |
|---|---|
| Abstract [57], line 22 | : "lest" should be --least-- |
| Column 3, line 22 | : "thanne" should be --thane-- |
| Column 3, line 36 | : Insert --3-- after "Example" |
| Column 6, line 5 | : " 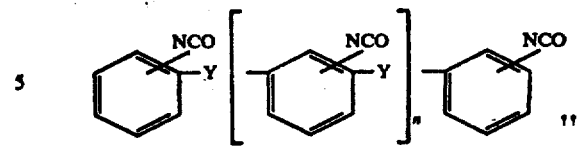 " | should be

-- 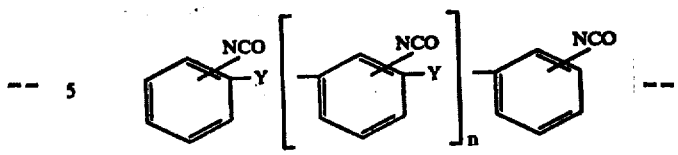 --

| | |
|---|---|
| Column 7, line 16 | : "in" should be --In-- |
| Column 7, line 38 | : "Firxt" should be --first-- |
| Column 8, line 10 | : "kPa" should be --KpA-- |
| Column 8, line 28 | : "defomation" should be --deformation-- |
| Column 9, line 6 | : "then;" should be --and-- |
| Column 9, lines 8 and 9 | : "formulation" should be --allowed-- |
| Column 9, line 20 | : "formation" should be --formulation-- |

UNITED STATES PATENT AND TRADEMARK OFFICE
CERTIFICATE OF CORRECTION

PATENT NO. : 4,134,610
DATED : January 16, 1979
INVENTOR(S) : Frank W. Lindewall It is certified that error appears in the above-identified patent and that said Letters Patent are hereby corrected as shown below:

Column 11, line 26 : "light" should be --lighter--

Column 11, line 56 : "deformatcion" should be --deformation--

Column 13, line 10 : "
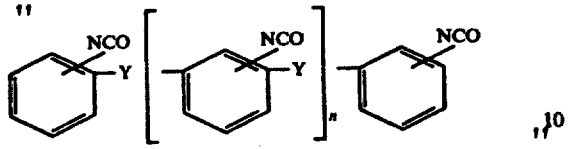
shou ld be

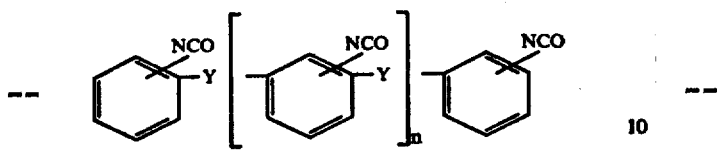

Signed and Sealed this

Twenty-fifth Day of December 1979

[SEAL]

Attest:

SIDNEY A. DIAMOND

Attesting Officer    Commissioner of Patents and Trademarks